(12) United States Patent
Valchok

(10) Patent No.: US 11,433,893 B2
(45) Date of Patent: Sep. 6, 2022

(54) METHODS AND PROCESSORS FOR CONTROLLING OPERATION OF SELF-DRIVING CAR

(71) Applicant: YANDEX SELF DRIVING GROUP LLC, Moscow (RU)

(72) Inventor: Andrei Yurievich Valchok, Minsk (BY)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 114 days.

(21) Appl. No.: 16/986,676

(22) Filed: Aug. 6, 2020

(65) Prior Publication Data
US 2021/0197821 A1 Jul. 1, 2021

(30) Foreign Application Priority Data

Dec. 25, 2019 (RU) .............................. RU2019143920

(51) Int. Cl.
*B60W 30/18* (2012.01)
*B60W 60/00* (2020.01)

(52) U.S. Cl.
CPC ..... *B60W 30/18154* (2013.01); *B60W 30/18159* (2020.02); *B60W 60/0017* (2020.02);
(Continued)

(58) Field of Classification Search
CPC ............... B60W 30/09; B60W 30/095; B60W 30/0956; B60W 30/181; B60W 30/18154;
(Continued)

(56) References Cited

U.S. PATENT DOCUMENTS 8,195,394 B1 * 6/2012 Zhu .................. G08G 1/096725
701/514
9,336,436 B1 * 5/2016 Dowdall ............ B60W 60/0027
(Continued)

FOREIGN PATENT DOCUMENTS

DE 102016219503 A1 4/2018
EP 3323690 A1 5/2018
(Continued)

OTHER PUBLICATIONS

Russian Search Report dated Apr. 8, 2021 issued in respect of the counterpart Russian Patent Application No. RU2019143920.
(Continued)

*Primary Examiner* — Russell Frejd
*Assistant Examiner* — Brandon Z Willis
(74) *Attorney, Agent, or Firm* — BCF LLP

(57) ABSTRACT

Methods and devices for controlling operation of a Self-Driving Car (SDC) are disclosed. The method includes, at a first moment in time during an approach of the SDC to a crosswalk: identifying, an object-inclusion zone in proximity to the crosswalk, determining presence of an object in the object-inclusion zone, determining an interval of time for the object based on movement data of the object, using the interval of time and movement data of the SDC for determining operation-control data for controlling operation of the SDC, and assigning decision data to the object-inclusion zone indicative of a decision.

14 Claims, 7 Drawing Sheets

(52) U.S. Cl.
CPC ..... *B60W 2552/45* (2020.02); *B60W 2552/53* (2020.02); *B60W 2554/4029* (2020.02)

(58) Field of Classification Search
CPC ..... B60W 30/18159; B60W 2050/065; B60W 60/0015; B60W 60/0017; B60W 60/0027; B60W 60/00272; B60W 60/00274; B60W 60/00276; B60W 2552/45; B60W 2552/53; B60W 2554/4029; B60W 2554/4045; B60W 2554/4041; B60W 2554/4044

See application file for complete search history.

(56) References Cited

U.S. PATENT DOCUMENTS

| | | | | |
|---|---|---|---|---|
| 2018/0151075 | A1* | 5/2018 | Claesson | B60Q 9/008 |
| 2019/0023239 | A1* | 1/2019 | Fujita | B60W 30/09 |
| 2019/0034794 | A1 | 1/2019 | Ogale et al. | |
| 2019/0056736 | A1 | 2/2019 | Wood et al. | |
| 2019/0061764 | A1* | 2/2019 | Tokuhiro | G06V 20/58 |
| 2019/0179029 | A1 | 6/2019 | Pacala et al. | |
| 2019/0236958 | A1* | 8/2019 | Fang | B60R 21/00 |
| 2021/0055733 | A1* | 2/2021 | Beller | B60W 30/18154 |
| 2021/0064889 | A1* | 3/2021 | Iglesias | G05D 1/0223 |

FOREIGN PATENT DOCUMENTS

| | | |
|---|---|---|
| EP | 3477615 A1 | 5/2019 |
| RU | 2708469 C2 | 12/2019 |
| WO | 2018147874 A1 | 8/2018 |
| WO | 2019073526 A1 | 4/2019 |
| WO | 2019089591 A1 | 5/2019 |

OTHER PUBLICATIONS

Extended European Search Report dated Mar. 30, 2021 issued in respect of the counterpart European Patent Application No. 20198348.3.

* cited by examiner

METHODS AND PROCESSORS FOR CONTROLLING OPERATION OF SELF-DRIVING CAR

CROSS-REFERENCE

The present application claims priority to Russian Patent Application No. 2019143920, entitled "Methods and Processors for Controlling Operation of Self-Driving Car", filed Dec. 25, 2019, the entirety of which is incorporated herein by reference.

FIELD OF TECHNOLOGY

The present technology relates to self-driving cars and, specifically, to a method of and a processor for controlling operation of a self-driving car.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacles) in front of the moving vehicle, slow down or stop the vehicle.

Some of the more advanced system provide for a fully autonomous driving of the vehicle without direct control from the operator (i.e. the driver), so-called Self-Driving Cars (SDCs). A given SDC includes computer systems that can cause the SDC to accelerate, break, stop, change lane and self-park.

One of the technical challenges in implementing the above computer systems is planning a SDC operation when approaching a crosswalk.

SUMMARY

It is an object of the present technology to ameliorate at least some of the inconveniences present in the prior art. Embodiments of the present technology may provide and/or broaden the scope of approaches to methods of achieving the aims and objects of the present technology.

Developers of the present technology have appreciated at least one technical problem associated with the prior art approaches.

In a first broad aspect of the present technology, there is provided a computer-implemented method for controlling operation of a Self-Driving Car (SDC). The method is executable by an electronic device coupled to the SDC. The method comprises, at a first moment in time during an approach of the SDC to a crosswalk, identifying, by the electronic device, an object-inclusion zone in proximity to the crosswalk. The object-inclusion zone potentially includes objects that are to cross the crosswalk. The method comprises, at a first moment in time during an approach of the SDC to a crosswalk, determining, by the electronic device, presence of an object in the object-inclusion zone. The object is identifiable by a first unique ID. The method comprises, at a first moment in time during an approach of the SDC to a crosswalk, determining, by the electronic device, an interval of time for the object based on movement data of the object. The interval of time is indicative of a temporal window during which the object is estimated to be crossing the crosswalk. The method comprises, at a first moment in time during an approach of the SDC to a crosswalk, using, by the electronic device, the interval of time and movement data of the SDC for determining operation-control data for controlling operation of the SDC. The operation-control data is indicative of a decision on a priority of way through the crosswalk between the SDC and the object. The method comprises, at a first moment in time during an approach of the SDC to a crosswalk, assigning, by the electronic device, decision data to the object-inclusion zone indicative of the decision, such that the priority of way between the SDC and any other object identifiable by an other unique ID that is different from the first unique ID in the object-inclusion zone is same as between the SDC and the object.

In some embodiments of the method, the method further comprises, at the first moment in time during the approach of the SDC to the crosswalk, triggering, by the electronic device, the SDC to operate in accordance with the operation-control data.

In some embodiments of the method, the triggering comprises one of (i) triggering, by the electronic device, the SDC to stop at the crosswalk and allowing any object from the object-inclusion zone to cross the crosswalk, and (ii) triggering, by the electronic device, the SDC to pass through the crosswalk before any object from the object-inclusion zone crosses the crosswalk.

In some embodiments of the method, the method further comprises, at the first moment in time during the approach of the SDC to the crosswalk, triggering, by the electronic device based on the operation-control data, the SDC to stop at the crosswalk and allowing any object from the object-inclusion zone to cross the crosswalk. The method further comprises, at a second moment in time while the SDC is stopped at the crosswalk, in response to any object from the object-inclusion zone exiting the object-inclusion zone and beginning crossing the crosswalk, assigning, by the electronic device, new decision data to the object-inclusion zone indicative of a new decision.

In some embodiments of the method, in response to the any object from the object-inclusion zone exiting the object-inclusion zone and beginning crossing the crosswalk, the method further comprises determining, by the electronic device, presence of a second object in the object-inclusion zone. The second object is identifiable by a second unique ID. In response to the any object from the object-inclusion zone exiting the object-inclusion zone and beginning crossing the crosswalk, the method further comprises determining, by the electronic device, a second interval of time for the second object based on movement data of the second object. The second interval of time is indicative of a second temporal window during which the second object is estimated to be crossing the crosswalk. In response to the any object from the object-inclusion zone exiting the object-inclusion zone and beginning crossing the crosswalk, the method further comprises using, by the electronic device, the second interval of time and movement data of the SDC for determining new operation-control data for controlling operation of the SDC. The new operation-control data is indicative of a new decision on a priority of way through the crosswalk between the SDC and the second object. The assigning the new decision data to the object-inclusion zone indicative of the new decision is performed by the electronic device such that the priority of way between the SDC and any other object identifiable by an other unique ID that is different from the second unique ID in the object-inclusion zone is same as between the SDC and the second object.

In some embodiments of the method, the method further comprises determining, by the electronic device, a buffered interval of time based on the interval of time and a first time buffer, so as to enlarge the temporal window during which the object is estimated to be crossing the crosswalk. The method further comprises using, by the electronic device, the buffered interval of time instead of the interval of time for determining the operation-control data. The method further comprises determining, by the electronic device, a second buffered interval of time based on the second interval of time and a second time buffer, so as to enlarge the second temporal window during which the second object is estimated to be crossing the crosswalk. The second time buffer is smaller than the first time buffer. The method further comprises using, by the electronic device, the second buffered interval of time instead of the second interval of time for determining the new operation-control data.

In some embodiments of the method, the method further comprises determining, by the electronic device, a buffered interval of time based on the interval of time and a first time buffer, so as to enlarge the temporal window during which the object is estimated to be crossing the crosswalk. The method further comprises using, by the electronic device, the buffered interval of time instead of the interval of time for determining the operation-control data.

In a second broad aspect of the present technology, there is provided an electronic device for controlling operation of a Self-Driving Car (SDC). The electronic device is coupled to the SDC. The electronic device is configured to, at a first moment in time during an approach of the SDC to a crosswalk, identify an object-inclusion zone in proximity to the crosswalk. The object-inclusion zone potentially includes objects that are to cross the crosswalk. The electronic device is configured to, at a first moment in time during an approach of the SDC to a crosswalk, determine presence of an object in the object-inclusion zone. The object is identifiable by a first unique ID. The electronic device is configured to, at a first moment in time during an approach of the SDC to a crosswalk, determine an interval of time for the object based on movement data of the object. The interval of time is indicative of a temporal window during which the object is estimated to be crossing the crosswalk. The electronic device is configured to, at a first moment in time during an approach of the SDC to a crosswalk, use the interval of time and movement data of the SDC for determining operation-control data for controlling operation of the SDC. The operation-control data is indicative of a decision on a priority of way through the crosswalk between the SDC and the object. The electronic device is configured to, at a first moment in time during an approach of the SDC to a crosswalk, assign decision data to the object-inclusion zone indicative of the decision, such that the priority of way between the SDC and any other object identifiable by an other unique ID that is different from the first unique ID in the object-inclusion zone is same as between the SDC and the object.

In some embodiments of the electronic device, the electronic device is further configured to, at the first moment in time during the approach of the SDC to the crosswalk, trigger the SDC to operate in accordance with the operation-control data.

In some embodiments of the electronic device, to trigger the electronic device is configured to one of (i) trigger the SDC to stop at the crosswalk and allowing any object from the object-inclusion zone to cross the crosswalk, and (ii) trigger the SDC to pass through the crosswalk before any object from the object-inclusion zone crosses the crosswalk.

In some embodiments of the electronic device, the electronic device is further configured to, at the first moment in time during the approach of the SDC to the crosswalk, trigger based on the operation-control data, the SDC to stop at the crosswalk and allowing any object from the object-inclusion zone to cross the crosswalk. The electronic device is further configured to, at a second moment in time while the SDC is stopped at the crosswalk, in response to any object from the object-inclusion zone exiting the object-inclusion zone and beginning crossing the crosswalk, assign new decision data to the object-inclusion zone indicative of a new decision.

In some embodiments of the electronic device, in response to the any object from the object-inclusion zone exiting the object-inclusion zone and beginning crossing the crosswalk, the electronic device is further configured to determine presence of a second object in the object-inclusion zone. The second object is identifiable by a second unique ID. In response to the any object from the object-inclusion zone exiting the object-inclusion zone and beginning crossing the crosswalk, the electronic device is further configured to determine a second interval of time for the second object based on movement data of the second object. The second interval of time is indicative of a second temporal window during which the second object is estimated to be crossing the crosswalk. In response to the any object from the object-inclusion zone exiting the object-inclusion zone and beginning crossing the crosswalk, the electronic device is further configured to use the second interval of time and movement data of the SDC for determining new operation-control data for controlling operation of the SDC. The new operation-control data is indicative of a new decision on a priority of way through the crosswalk between the SDC and the second object. The electronic device is configured to assign the new decision data to the object-inclusion zone indicative of the new decision such that the priority of way between the SDC and any other object identifiable by an other unique ID that is different from the second unique ID in the object-inclusion zone is same as between the SDC and the second object.

In some embodiments of the electronic device, the electronic device is further configured to determine a buffered interval of time based on the interval of time and a first time buffer so as to enlarge the temporal window during which the object is estimated to be crossing the crosswalk. The electronic device is further configured to use the buffered interval of time instead of the interval of time for determining the operation-control data. The electronic device is further configured to determine a second buffered interval of time based on the second interval of time and a second time buffer so as to enlarge the second temporal window during which the second object is estimated to be crossing the crosswalk. The second time buffer is smaller than the first time buffer. The electronic device is further configured to use the second buffered interval of time instead of the second interval of time for determining the new operation-control data.

In some embodiments of the electronic device, the electronic device is further configured to determine a buffered interval of time based on the interval of time and a first time buffer, so as to enlarge the temporal window during which the object is estimated to be crossing the crosswalk. The electronic device is further configured to use the buffered interval of time instead of the interval of time for determining the operation-control data.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
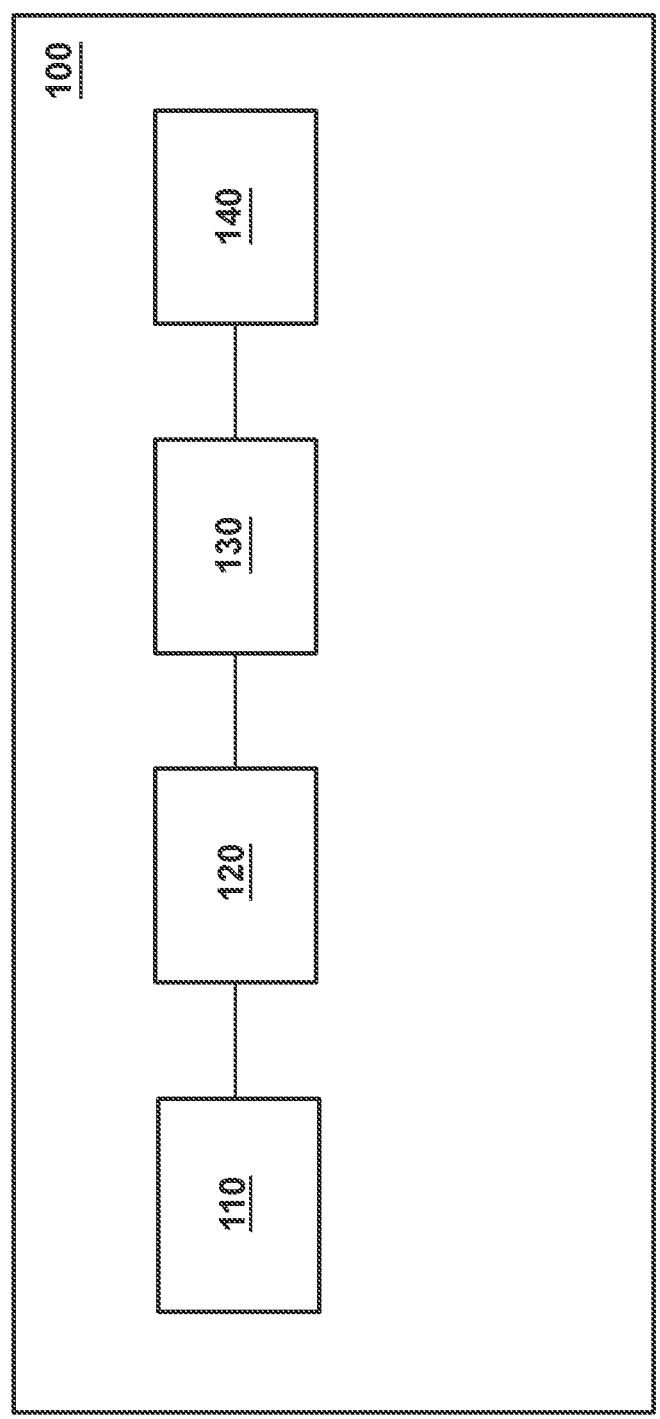
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

In at least some embodiments of the present technology, the solid-state drive 120 stores program instructions suitable for being loaded into the memory 130 and executed by the processor 110 for determining a presence of an object. For example, the program instructions may be part of a vehicle control application executable by the processor 110.

In at least some embodiments of the present technology, it is contemplated that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
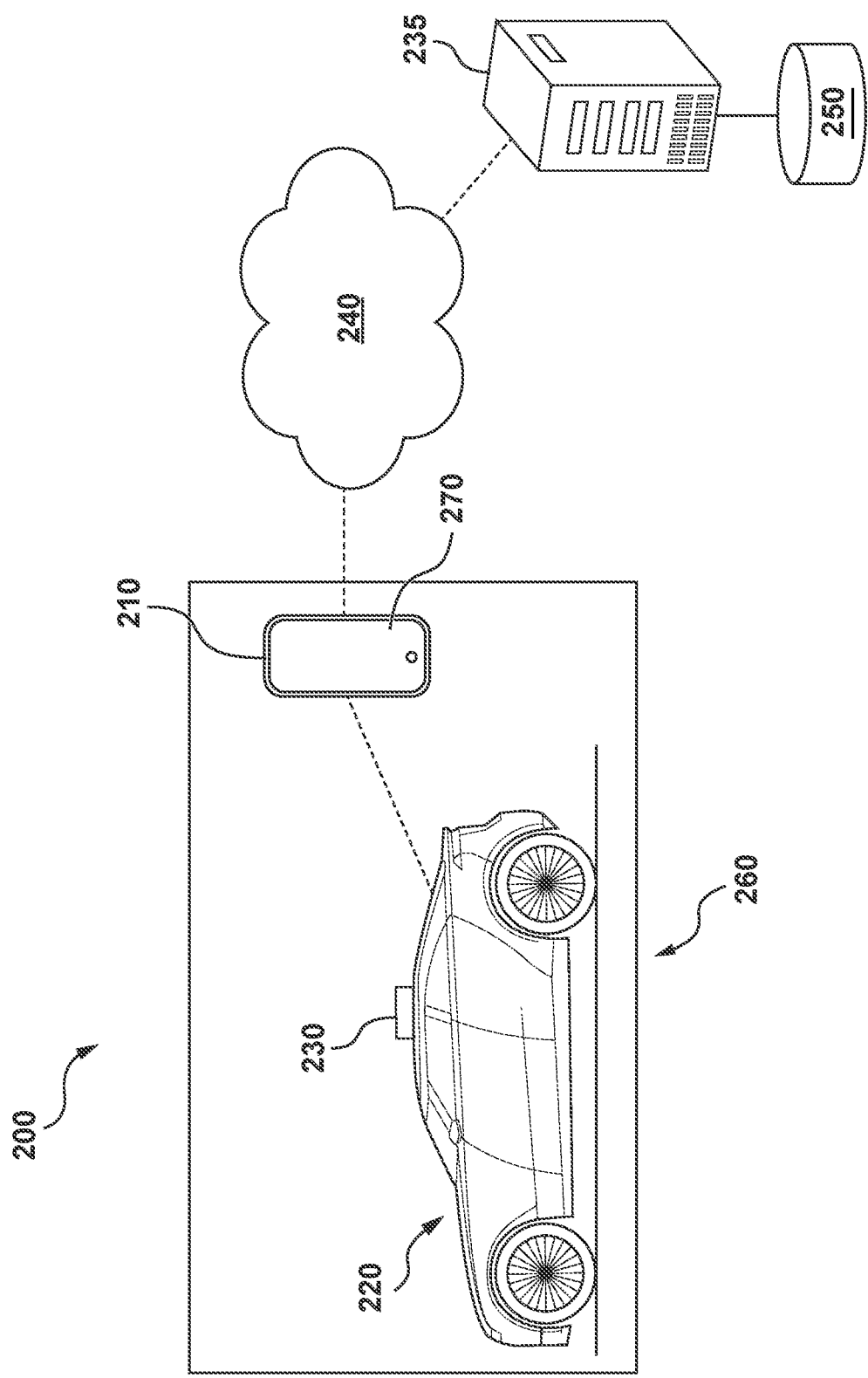
FIG. 2 depicts a networked computing environment suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, with which the electronic device 210 is associated, may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the vehicle 220 at a given road segment considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the sensor system 230 can be mounted in a dedicated enclosure (not depicted) mounted on the top of the vehicle 220.

Further, the spatial placement of the sensor system 230 can be designed taking into account the specific technical configuration thereof, configuration of the enclosure, weather conditions of the area where the vehicle 220 is to be used (such as frequent rain, snow, and other elements) or the like.

In the non-limiting embodiments of the present technology, the sensor system 230 may comprise a sensor configured to capture an image of a surrounding area 260. In this regard the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determine portion of the surrounding area 260 around the vehicle 220. In some embodiments of the present technology, the camera is configured to capture an image (or a series of images) that represent approximately 90 degrees of the surrounding area 260 around the vehicle 220 that are along a movement path of the vehicle 220.

In other embodiments of the present technology, the camera is configured to capture an image (or a series of images) that represent approximately 180 degrees of the surrounding area 260 around the vehicle 220 that are along a movement path of the vehicle 220. In yet additional embodiments of the present technology, the camera is configured to capture an image (or a series of images) that represent approximately 360 degrees of the surrounding area 260 around the vehicle 220 that are along a movement path of the vehicle 220 (in other words, the entirety of the surrounding area around the vehicle 220).

In a specific non-limiting example, the camera can be of the type available from FLIR Integrated Imaging Solutions Inc., 12051 Riverside Way, Richmond, BC, V6W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for LIght Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light ($\sim 3 \times 10^8$ m/s), the processor 110 can then calculate how far the photons have travelled (in the round trip). Photons can be scattered back off of many different entities surrounding the vehicle 220, such as other particles (aerosols or molecules) in the atmosphere, other card, stationary objects or potential obstructions in front of the vehicle 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, Calif. 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a RAdio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects.

In alternative embodiments of the present technology, there may be a separate antenna for receiving waves, and a separate antenna for transmitting waves. The processor used for determining properties of surrounding objects may be the processor 110.

In some embodiments of then present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 are calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the vehicle 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with a server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like.

In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Storage

In FIG. 2, there is also depicted a storage 250 communicatively coupled to the server 235. In some embodiments, however, the storage 250 may be communicatively coupled to the electronic device 210 and/or may be implemented within the electronic device 210 and/or may be communicatively coupled to any other processor of the networked computer environment 200.

In at least some embodiments, it is contemplated that the storage 250 may be used by the server 235, the electronic device 210 and/or any other processor of the networked computer environment 200 as a memory device for storing information. The storage 250 is configured to store information extracted, determined and/or generated by the processor 110 of the server 235 and/or the electronic device 210. Generally speaking, the storage 250 may receive data from the processor 110 which was generated by the processor 110 during processing for temporary and/or permanent storage thereof and may provide stored data to the processor 110 for use thereof. It is contemplated that the storage 250 may be split into several distributed storages, for providing a fault-tolerant storage system for example, without departing from the scope of the present technology.

It should be noted that in at least some embodiments of the present technology, the storage 250 may be implemented locally on the electronic device 210 and/or the server 235 (such as on a local memory, for example). It is also contemplated however that the storage 250 may be implemented remotely from the electronic device 210 and/or the server 235 (such as on a remote memory, for example).

Electronic Device

In some embodiments of the present technology, broadly speaking, the electronic device 210 may be configured to control operation of the vehicle 220. More specifically, the electronic device 210 may be configured to control operation of the vehicle 220 when in proximity with a pre-determined zone, such as a crosswalk. In one example, the electronic device 210 may be configured to determine operation-control data for controlling operation of the vehicle 220 when the vehicle 220 is approaching a given crosswalk. In another example, the electronic device 210 may also be configured to determine operation-control data for controlling operation of the vehicle 220 when the vehicle 220 is stopped at the given crosswalk.

Developers of the present technology have devised methods and systems for controlling operation of the vehicle 220 during its approach to the given crosswalk in a different manner to when the vehicle 220 is stopped at the given crosswalk.

For example, in at least some implementations of the present technology, the vehicle 220 may be triggered to operate in a, in a sense, "courteous" manner when approaching the given crosswalk—that is, the operation-control data may be used to operate the vehicle 220 such that it is more likely that the vehicle 220 gives priority of way to pedestrian(s) (or other objects) at the given crosswalk. In another example, the vehicle 220 may be triggered to operate in a less "courteous" manner when the vehicle 220 is already stopped at the given crosswalk if compared to when the vehicle 220 is approaching the given crosswalk—that is, the operation-control data may be used to operate the vehicle 220 such that it is less likely that the vehicle 220 gives priority of way to pedestrian(s) (or other objects) when the vehicle 220 is stopped at the given crosswalk if compared to the likeliness of the vehicle 220 giving priority of way to pedestrian(s) (or other objects) during its approach to the given crosswalk. How the electronic device 210 may be configured to determine such operation-control data in both situations will become apparent from the description herein further below.

Developers of the present technology have also devised methods and systems for reducing an amount of computer resources required for performing a decision-making process on whether to give priority of way at the given crosswalk to a pedestrian (or other object). Developers of the present technology have realized that at least some prior art solutions require performing redundant operations for making a decision on whether to give priority of way at the given crosswalk to a pedestrian (or other object).

Figure 3:
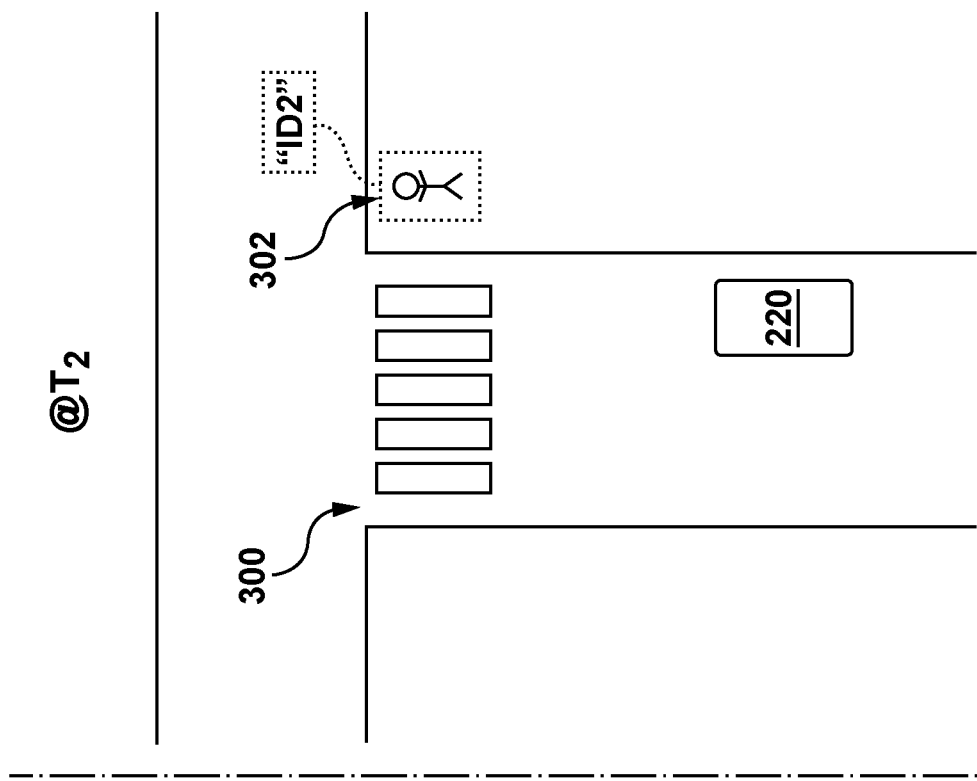
FIG. 3 depicts a vehicle of the networked computing environment of FIG. 2 approaching a crosswalk at different moments in time.
Figure 3:
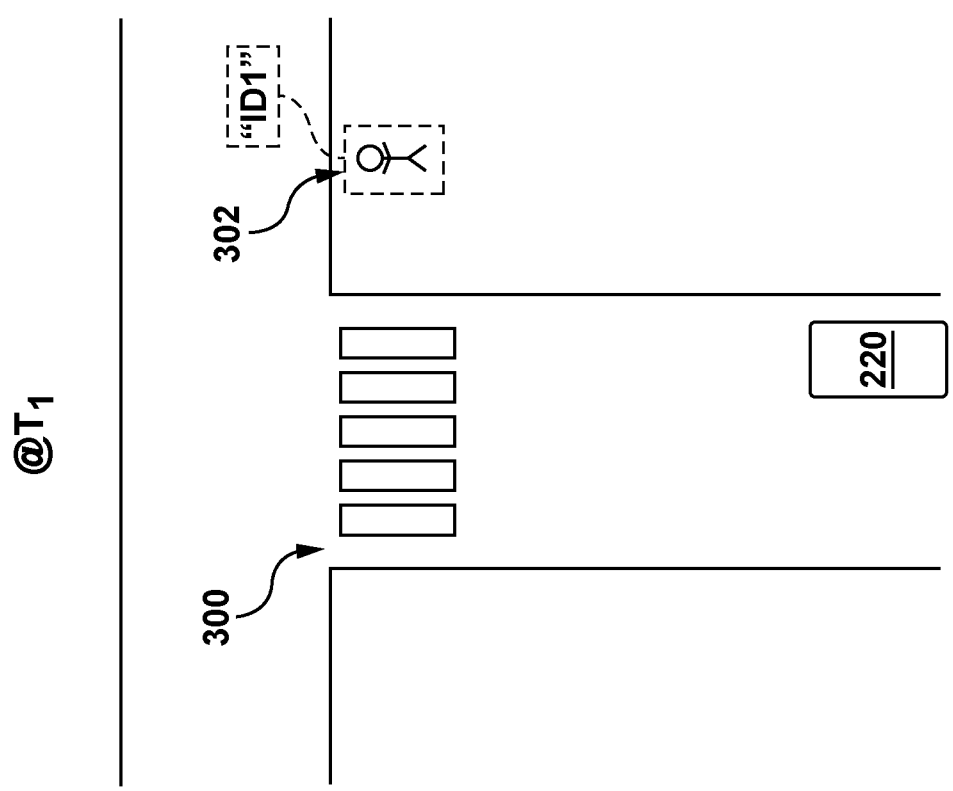

To better illustrate this, reference will now be made to FIG. 3 depicting the vehicle 220 (i) approaching a crosswalk 300 at a moment T1, and (ii) approaching the crosswalk 300 at a moment T2 that is after the moment T1.

It should be noted that at the moment T1, the electronic device 210 associated with the vehicle 220 may be configured to determine presence of the crosswalk 300 in the proximity of the vehicle 220. In one implementation, the electronic device 210 may be configured to acquire road map data from the server 235, for example, which is indicative of the presence of the crosswalk 300 in the proximity of the vehicle 220. In another implementation, the electronic device 210 may be configured to acquire sensor data from the sensor system 230 of the vehicle 220, for example, which is indicative of the presence of the crosswalk 300 in the proximity of the vehicle 220. It is contemplated that the electronic device 210 may determine presence of the crosswalk 300 in proximity of the vehicle 220 by employing both the road map data and the sensor data, without departing from the scope of the present technology.

It should also be noted that at the moment T1 the electronic device 210 may be configured to determine presence of an object 302 in proximity of the crosswalk 300. In one implementation, the electronic device 210 may be configured to acquire sensor data from the sensor system 230 of the vehicle 220, for example, and which is indicative of the presence of the object 302 in proximity of the crosswalk 300. As a result, the electronic device 210 may be configured to assign a unique ID to the object 302 at the moment T1 for identifying the object 302 at the moment T1 and thereafter. As illustrated in FIG. 3, let it be assumed that the electronic device 210 assigns a unique ID "ID1" to the object 302 at the moment T1.

The electronic device 210 may then be configured to, in a sense, make a decision on whether to give priority of way to the object 302 identifiable via ID1 and, therefore, determine either to (i) let the object 302 cross the crosswalk 300 before triggering the vehicle 220 to drive through the crosswalk 300, or otherwise (ii) trigger the vehicle 220 to drive through the crosswalk 300 before the object 302 identifiable via ID1. For sake of illustration, let it be assumed that the electronic device 210 made the decision at the moment T1 to trigger the vehicle 220 to let the object 302 identifiable as ID1 cross the crosswalk 300 first.

It should be noted that there are many situations in which the electronic device 210 may not be able to identify the object 302 via a same unique ID at the moment T2 as the electronic device 210 does during moment T1. Just as an example, the object 302 may have been partially hidden between moments T1 and T2 by an obstacle, and thus be considered as a new object by the electronic device 210. Irrespective of the specific reason why the electronic device 210 is not able to identify the object 302 via the same unique ID at the moment T2 as during the moment T1, the electronic device 210 may identify the object 302 during the moment T2 via a different unique ID. As illustrated in FIG. 3, let it be assumed that the electronic device 210 detects presence of the object 302 at the moment T2 and identifies the object 302 at the moment T2 by a new unique ID "ID2".

This identification of the object 302 via different unique IDs at the moments T1 and T2 may result in a redundant decision-making process regarding the priority of way between the vehicle 220 and the object 302 at the crosswalk 300. It should be recalled that the electronic device 210 may be storing data indicative of the priority of way of a given object identifiable via ID1 at the crosswalk 300, but does not have data indicative of a priority of way of a given object identifiable via ID2 at the crosswalk 300, since this data has not yet been computed. As such, the electronic device 210 would need to perform the decision-making process anew for the given object identifiable via ID2, even though the decision to let the object 302 cross the crosswalk 300 first has been previously made during the moment T1.

Given the above scenario, the electronic device 210 would need to perform the decision-making process on the priority of way for the object 302 at the moment T1 and at the moment T2, which results in an unnecessary use of computer resources. As mentioned above, developers of the present technology have devised methods and systems that allow reducing the amount of redundant computations for making a decision on whether to give priority of way to an object or not to; and more specifically, to address the situation that has been presented immediately above. How the electronic device 210 may be configured to perform such resource-efficient decision-making process will now be describe with reference to FIG. 4.

Figure 4:
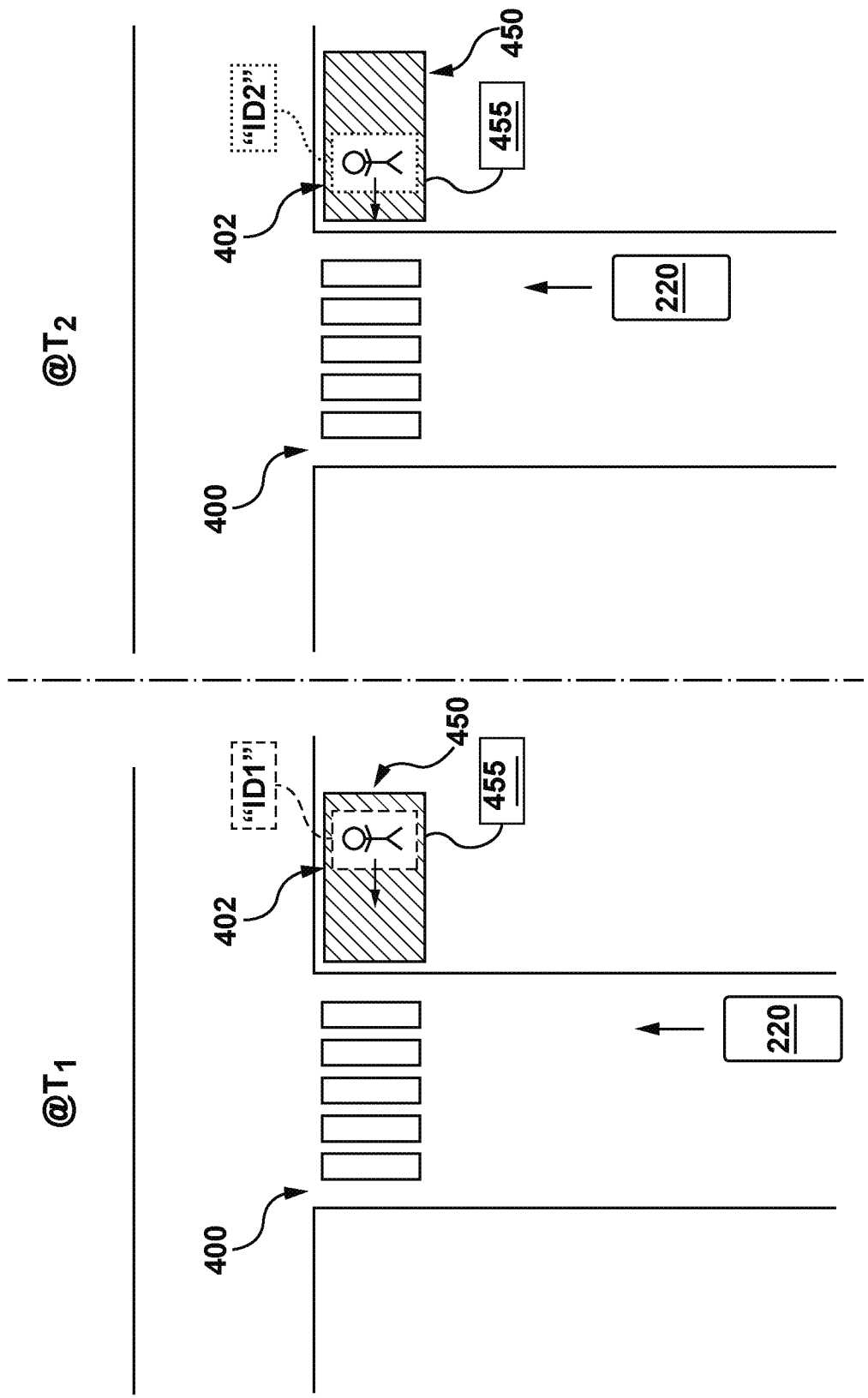
FIG. 4 depicts the vehicle of the networked computing environment of FIG. 2 approaching the crosswalk at different moments in time and where an object-inclusion zone is detected in proximity to the crosswalk, in accordance with at least some embodiments of the present technology.

In FIG. 4, similarly to FIG. 3, there is depicted the vehicle 220 (i) approaching a crosswalk 400 at the moment T1, and (ii) approaching the crosswalk 400 at the moment T2 that is after the moment T1.

It should be noted that at the moment T1, the electronic device 210 associated with the vehicle 220 may be configured to determine presence of the crosswalk 400 in the proximity of the vehicle 220. In one implementation, the electronic device 210 may be configured to acquire road map data from the server 235, for example, which is indicative of the presence of the crosswalk 400 in the proximity of the vehicle 220. In another implementation, the electronic device 210 may be configured to acquire sensor data from the sensor system 230 of the vehicle 220, for example, which is indicative of the presence of the crosswalk 400 in the proximity of the vehicle 220.

In some embodiments of the present technology, the electronic device 210 may be configured to identify an object-inclusion zone 450 in proximity to the crosswalk 400. Broadly speaking, the object-inclusion zone 450 is a given zone in proximity of the crosswalk 400 that can potentially include objects that are to cross the crosswalk 400.

The electronic device 210 may be configured to identify the object-inclusion zone 450 in any suitable manner for a given application. In some non-limiting embodiments of the present technology, the size of the object-inclusion zone 450 is pre-determined. As an example, the object-inclusion zone 450 may be identified as a rectangular box sized 2 m×5 m area of a side walk being located at one end of the crosswalk 400. Nevertheless, object-inclusion zones having smaller areas or larger areas than the previously mentioned area are also contemplated in at least some embodiments of the present technology. In other non-limiting embodiments of the present technology, the size of the object-inclusion zone 450 may be proportionate to the size of the crosswalk 400. As an example, the larger the size of the crosswalk 400, the larger the size of the object-inclusion zone 450. In yet further non-limiting embodiments of the present technology, the shape of the object-inclusion zone 450 can be other than a rectangular box, such as a polygon-shaped zone, irregular shape zone, or the like.

It should be noted that in some embodiments, the electronic device 210 may be configured to identify more than one object-inclusion zone in proximity to the crosswalk 400. For example, the electronic device 210 may be configured to identify an other object-inclusion zone (not depicted) on a left end of the crosswalk 400, similarly to how the electronic device 210 is configured to identify the object-inclusion zone 450 on a right end of the crosswalk 400.

The electronic device 210 may be configured to determine presence of an object 402 in the object-inclusion zone 450. In one implementation, the electronic device 210 may be configured to acquire sensor data from the sensor system 230 of the vehicle 220, for example, which is indicative of the presence of the object 402 in the object-inclusion zone 450. As a result, the electronic device 210 may be configured to assign a unique ID to the object 402 at the moment T1 for identifying the object 402 at the moment T1. As illustrated in FIG. 4, let it be assumed that the electronic device 210 assigns a unique ID "ID1" to the object 402 at the moment T1.

In some embodiments of the present technology, the electronic device 210 may be configured to acquire movement data for the object 402. In one implementation, the electronic device 210 may receive sensor data from the sensor system 230 of the vehicle, for example, which is indicative of movement data of the object 402. For example, movement data of the object 402 may be indicative of current position, current velocity, and/or current acceleration of the object 402 and/or predicated future position, predicted future velocity, and/or predicted future acceleration of object 402. Put another way, the movement data of the object 402 may be indicative of a current movement of the object 402 and/or predicted future movement of the object 402.

In some embodiments, the electronic device 210 may also be configured to acquire movement data of the vehicle 220. The electronic device 210 may be configured to acquire the movement data of the vehicle 220 in any suitable manner for a given application.

Figure 5:
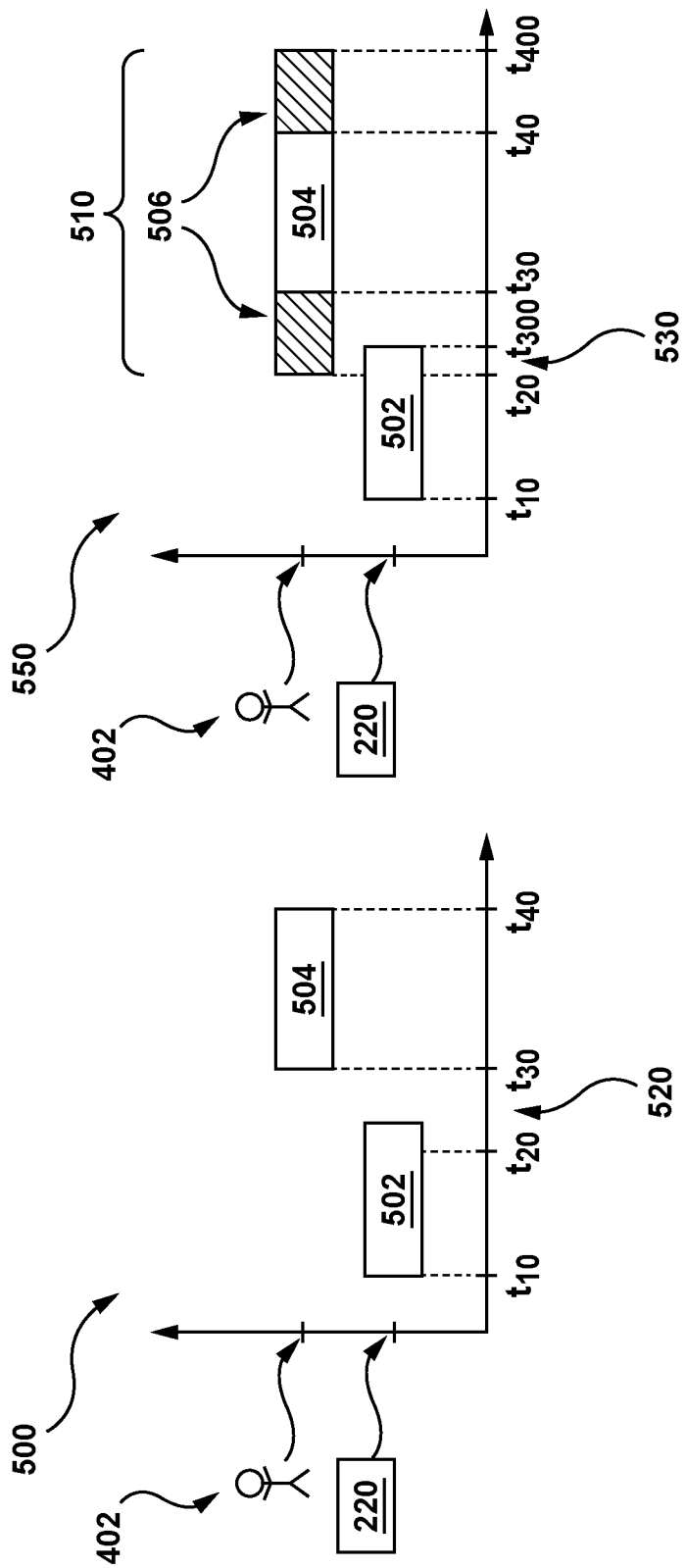
FIG. 5 depicts representations of how a decision on priority of way between an object and the vehicle is performed, in accordance with at least some embodiments of the present technology.

Irrespective of how the electronic device 210 acquires the movement data for the object 402 and the vehicle 220, with reference to FIG. 5, there is depicted a first representation 500 of how the electronic device 210 may be configured to use the movement data of the object 402 and of the vehicle 220.

The electronic device 210 may be configured to determine an interval of time 504 for the object 402 based on the movement data of the object 402. Broadly speaking, the interval of time 504 for object 402 is indicative of a temporal window during which the object 402 is estimated/predicted to be crossing the crosswalk 400. For example, the electronic device 210 may be configured employ the movement data of the object 402 in order to determine (i) a moment in time t30 when the object 402 is estimated to engage the crosswalk 400 and thereby start crossing the crosswalk 400, and (ii) a moment in time t40 when the object 402 is estimated to disengage the crosswalk 400 and thereby finish crossing the crosswalk 400 at the other side thereof.

In some embodiments, the electronic device 210 may also be configured to determine an other interval of time 502 for the vehicle 220 based on movement data of the vehicle 220. Broadly speaking, the interval of time 502 for vehicle 220 is indicative of a temporal window during which the vehicle 220 is estimated/predicted to be driving through the crosswalk 400. For example, the electronic device 210 may be configured employ the movement data of the vehicle 220 in order to determine (i) a moment in time t10 when the vehicle 220 is estimated to engage the crosswalk 400 and thereby start driving through the crosswalk 400, and (ii) a moment in time t20 when the vehicle 220 is estimated to disengage the crosswalk 400 and thereby finish driving through the crosswalk 400.

In some embodiments of the present technology, the electronic device 210 may be configured to determine the interval of time 504 and the interval of time 502 in a common time referential as illustrated in FIG. 5. As seen, the interval of time 502 is not overlapping the interval of time 504, which means that the electronic device 210 determined, based on the movement data of the object 402 and of the vehicle 220, that the vehicle 220 is estimated to drive through the crosswalk 400 before the object 402 engages the crosswalk 400 and starts crossing it. In particular, the electronic device 210 may be configured to determine a safety interval 520 bounded (i) by the moment in time t20 corresponding to when the vehicle 220 is estimated to disengage the crosswalk 400 and thereby finish driving through the crosswalk 400, and by (ii) the moment in time t30 corresponding to when the object 402 is estimated to engage the crosswalk 400 and thereby start crossing the crosswalk 400.

However, in at least some embodiments of the present technology, with reference to representation 550 of FIG. 5, the electronic device 210 may be configured to determine a buffered interval of time 510 for the object 402. Broadly speaking, the electronic device 210 may be configured to determine the buffered interval of time 510 by adding a time buffer 506 to the interval of time 502 so as to enlarge the temporal window during which the object 402 is estimated to be crossing the crosswalk 400. As such, the electronic device 210 may be configured to determine the buffered interval of time 510 by determining (i) a moment in time t300 and (ii) a moment in time t400, by adding a respective portion of the time buffer 506 on each end of the interval of time 504.

It is contemplated that the electronic device 210 may be configured to add the time buffer 506 to the interval of time 504 for different reasons. In one case, the electronic device 210 may be configured to determine the buffered interval of time 510 for safety purposes if ever the temporal window for the object 402 is erroneously estimated based on the movement data of the object 402. In another case, the electronic device 210 may be configured to determine the buffered interval of time 510 for courteous purposes to increase a number of instances when the electronic device 210 is to trigger the vehicle 220 to let the object 402 cross the crosswalk 400 before driving through it.

The length of time represented by the time buffer 506 may be determined in any suitable manner for a given application. However, as it will become apparent from the description herein below, it is contemplated that the length of time representing a given time buffer being added to a given interval of time for a given object may be different depending on whether the vehicle 220 is approaching the crosswalk 400 or whether the vehicle 220 is stopped at the crosswalk 400.

As seen in FIG. 5, the buffered interval of time 510 of the object 402 is partially overlapping the interval of time 502 of the vehicle 220. In other words, the electronic device 210 may determine an overlapping interval 530 indicative of that the vehicle 220 is estimated to still be driving through the crosswalk 400 when the object 402 is estimated to engage the crosswalk 400 and, thus, that a modification to the trajectory of the vehicle 220 may be required, such as stopping, for example.

Overall, it can be said the electronic device 210 is configured to (i) determine the interval of time 504 for the object 402 based on the movement data of the object 402 (and, optionally determine the buffered interval of time 510 for the object 402 based on the interval of time 504 and the time buffer 506), (ii) use the interval of time 502 (and, optionally the buffered interval of time 510) and the movement data of the vehicle 220 to determine operation-control data for controlling operation of the vehicle 220, and where the operation-control data is indicative of a decision on a priority of way through the crosswalk 400 between the vehicle 220 and the object 402.

For example, if the electronic device 210 determines that the interval of time 504 (or potentially, the buffered interval of time 510) at least partially overlaps the interval of time 502 of the vehicle 220, the operation-control data may be indicative of a decision that the object 402 has priority of way through the crosswalk 400 before the vehicle 220. In this case, the operation-control data may be used by the electronic device 210 to trigger the vehicle 220 to stop at the crosswalk 400, before driving through it, and let the object 402 cross the crosswalk 400 first.

In another example, if the electronic device 210 determines that the interval of time 504 (or potentially, the buffered interval of time 510) does not overlap the interval of time 502 of the vehicle 220, the operation-control data may be indicative of a decision that the vehicle 220 has priority of way through the crosswalk 400 before the object 402. In this case, the operation-control data may be used by the electronic device 210 to trigger the vehicle 220 to drive through the crosswalk 400, before the object 402 engages the crosswalk 400 and starts crossing it.

Returning to FIG. 4, irrespective of what decision is taken on the priority of way between the vehicle 220 and the object 402, in some embodiments of the present technology, the electronic device 210 may be configured to assign decision data 455 that is indicative of this decision to the object-inclusion zone at the moment T1 so that it can be employed at a later moment, such as the moment T2, for example.

It should be noted that the decision data 455, although determined at least partially based on the movement data of the object 402 identifiable via ID1 at the moment T1, is assigned to the object-inclusion zone 450, as opposed to being assigned to the object 402 identifiable via ID1 at the moment T1. As it will now be discussed in greater details herein below, developers of the present technology have realized that assigning the decision data 455 to the object-inclusion zone 450, instead of assigning the decision data 455 to a given object identifiable via some unique ID, allows avoiding redundant computation of decision data at later moments in time, such as at the moment T2, for example.

Indeed, by assigning the decision data 455 to the object-inclusion zone 450 allows the electronic device 210 to, in a sense, access "knowledge" regarding the priority of way between the vehicle 220 and any object in the object-inclusion zone 450 that is identifiable by a different unique ID than the unique ID of an object based on which the decision data 455 has been determined.

To better illustrate this, let it be assumed that at the moment T2, irrespective of the reason therefor, the object 402 is now identified by a unique ID "ID2" which is different from the unique ID "ID1" of the object 402 at the moment T1. Hence, for all intents and purposes, the electronic device 210 appreciates the object 402 with the unique ID "ID2" at the moment T2 as a different object from the object 402 with the unique ID "ID1" at the moment T1. However, instead of unnecessarily repeating the decision-making process on the priority of way between the vehicle 220 and the object 402 identifiable via "ID2" at the moment T2, the electronic device 210 may be configured to access the decision data 455 associated with the object-inclusion zone 450 and determine that the vehicle 220 has priority of way over the object 402 identifiable via "ID2" at the moment T2.

As a result, by accessing the decision data 455 at the moment T2, the electronic device 210 does not require to repeat the decision-making process on the priority of way and does not require re-computation of operation-control data for the vehicle 220 at the moment T2 and, instead, use the operation-control data that has been determined for the vehicle 220 at the moment T1. This means that at the moment T2, although the electronic device 210 detects presence of the object 402 identifiable by a given unique ID for which it has not yet made a decision on priority of way, the electronic device 210 may access the decision data 455 assigned to the object-inclusion zone 450 in which the object 402 identifiable by this given unique ID is located and, as a result, employs the operation-control data that has been determined at the moment T1 in order to control operation of the vehicle 220 at the moment T2. Hence, the electronic device 210 may be configured to trigger the vehicle 220 to stop at the crosswalk 400 and let the object 402 identifiable via the unique ID "ID2" to cross the crosswalk 400 first.

Figure 6:
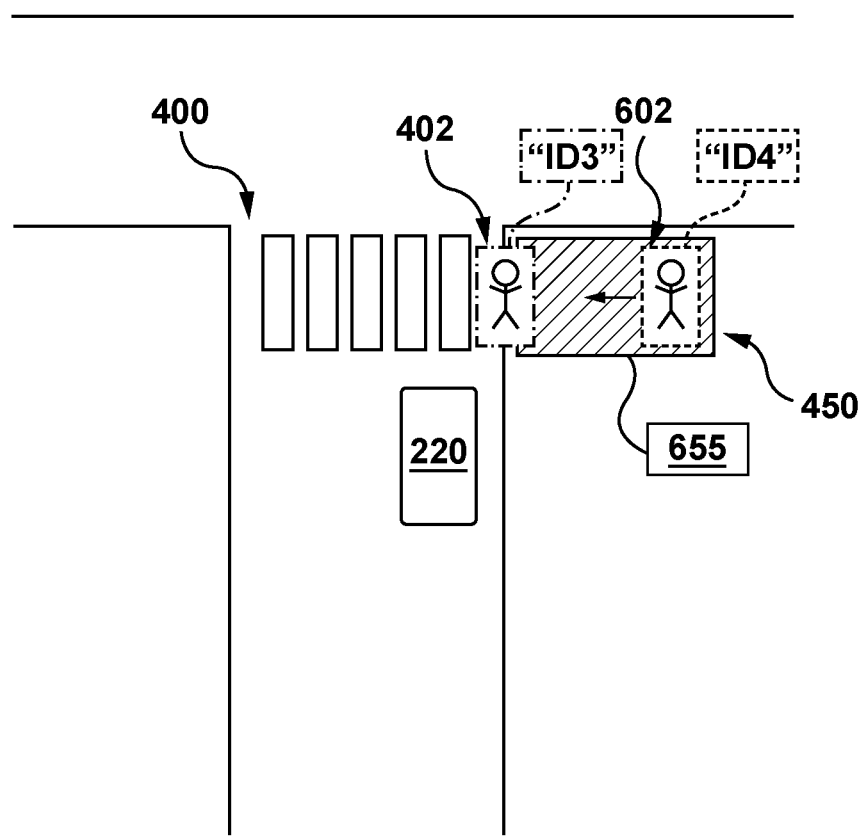
FIG. 6 depicts the vehicle of the networked computing environment of FIG. 2 stopped at the crosswalk at another moment in time and where the object-inclusion zone is detected in proximity to the crosswalk and where some object is exiting the object-inclusion zone and begins crossing the crosswalk, in accordance with at least some embodiments of the present technology.

With reference to FIG. 6, there is depicted the vehicle 220 stopped at the crosswalk 400 at a moment T3, that is after the moment T2. For example, the electronic device 210 may be configured to trigger the vehicle 220 to operate in accordance with the operation-control data and, in this case as mentioned above, the electronic device 210 may be configured to trigger the vehicle 220 to stop at the crosswalk 400 and allow any object from the object-inclusion zone 450 to cross the crosswalk 400 first.

In at least some embodiments of the present technology, in response to any object from the object-inclusion zone 450 exiting the object-inclusion zone 450 and beginning crossing the crosswalk 400, the electronic device 210 may be configured to assign new decision data 655 to the object-inclusion zone 450. Put another way, in response to any object from the object-inclusion zone 450 exiting the object-inclusion zone 450 and beginning crossing the crosswalk 400, the electronic device 210 may be configured to perform anew the decision-making process for the object-inclusion zone 450.

For example, as illustrated, let it be assumed that the object 402 at the moment T3 is identifiable via a unique ID "ID3". As mentioned above, there are different reasons why the object 402 may be identifiable by a different unique ID at the moment T3 than at the moments T1 and T2. However, regardless of the object 402 being identifiable via the unique ID "ID3" at the moment T3, the electronic device 210 may be configured to use the sensor data of the vehicle 220 to determine that some object (in this case, the object 402 being identifiable via the unique ID "ID3") from the object-inclusion zone 450 is exiting the object-inclusion zone 450 and begins to cross the crosswalk 400 at the moment T3.

Also, the moment T3, the electronic device 210 may be configured to use the sensor data of the vehicle 220 to determine presence of a second object 602 in the object-inclusion zone 450. For example, the electronic device 210 may be configured to identify the second object 602 at the moment T3 via a unique ID "ID4". It should be noted that, since the electronic device 210 determines that some object is exiting the object-inclusion zone 450 and begins crossing the crosswalk 400 at the moment T3, the electronic device 210 may be configured to determine the new decision data 655 for the object-inclusion zone 450 at the moment T3 based on the second object 602 identifiable via unique ID "ID4" at the moment T3.

Similarly to how the electronic device 210 is configured to determine the interval of time 504 (or potentially the buffered interval of time 510) for the object 402 at the moment T1, the electronic device 210 may be configured to determine a second interval of time for the second object 602 at the moment T3 based on movement data of the second object 602. The electronic device 210 is thereby configured to determine a second temporal window for the second object 602 during which the second object 602 is estimated to be crossing the crosswalk 400.

Then, the electronic device 210 may be configured to use movement data of the vehicle 220 and the second interval of time of the second object 602 for determining new operation-control data for controlling operation of the vehicle 220. The new operation-control data is indicative of a new decision on a priority of way through the crosswalk 400 between the vehicle 220 and the second object 602.

As a result, at the moment T3, the electronic device 210 may be configured to assign the new decision data 655 to the object-inclusion zone 450 that is indicative of the new decision on the priority of way. Let it be assumed that the second interval of time for the second object 602 does not overlap an interval of time of the vehicle 220 during which the vehicle 220 may cross the crosswalk 400. As such, the new operation-control data may be indicative of a decision to let the vehicle 220 drives through the crosswalk 400 before the second object 602 crosses the crosswalk 400.

As previously alluded to, developers of the present technology have devised methods and systems for controlling operation of the vehicle 220 during its approach to the crosswalk 400 in a different manner to when the vehicle 220 is stopped at the crosswalk 400.

For example, the vehicle 220 may be triggered to operate in a less "courteous" manner when the vehicle 220 is already stopped at the crosswalk 400 if compared to when the vehicle 220 is approaching the crosswalk 400. In at least some embodiments of the present technology, developers of the present technology have realized that this may be achieved by employing different time buffers for determining buffered intervals of time depending on whether the vehicle 220 is approaching the crosswalk 400 or whether the vehicle 220 is already stopped at the crosswalk 400.

As mentioned above, during the moment T1, the electronic device 210 may be configured to determine the buffered interval of time 510 based on the interval of time 504 for the object 402 and on the time buffer 506 (see FIG. 5). It should be noted that, the larger the length of time representing the time buffer 506, the more likely there will be an overlap between the interval of time 502 of the vehicle 220 and the buffered interval of time 510, and hence, the more likely that the decision-making process results in the object 402 having priority of way over the vehicle 220.

Hence, the electronic device 210 may be configured to use a somewhat larger time buffer for determining the buffered interval of time for a given object when the vehicle 220 is approaching the crosswalk 400 so as to operate the vehicle 220 in a more "courteous" manner during the approach. However, the electronic device 210 may be configured to use a somewhat smaller time buffer for determining the buffered interval of time for a given object when the vehicle 220 is stopped at the crosswalk 400 so as to operate the vehicle 220 in a less "courteous" manner during a moment when the vehicle 220 is stopped. Put another way, the electronic device 210 may be configured to trigger the vehicle 220 to operate in a less "courteous" manner when the vehicle 220 is already stopped at the crosswalk 400 if compared to when the vehicle 220 is approaching the crosswalk 400, by employing a given time buffer during a moment when the vehicle 220 is stopped that has a shorter length in time than the length of time of the time buffer 506 that is employed at a moment when the vehicle 220 is approaching the crosswalk 400.

Figure 7:
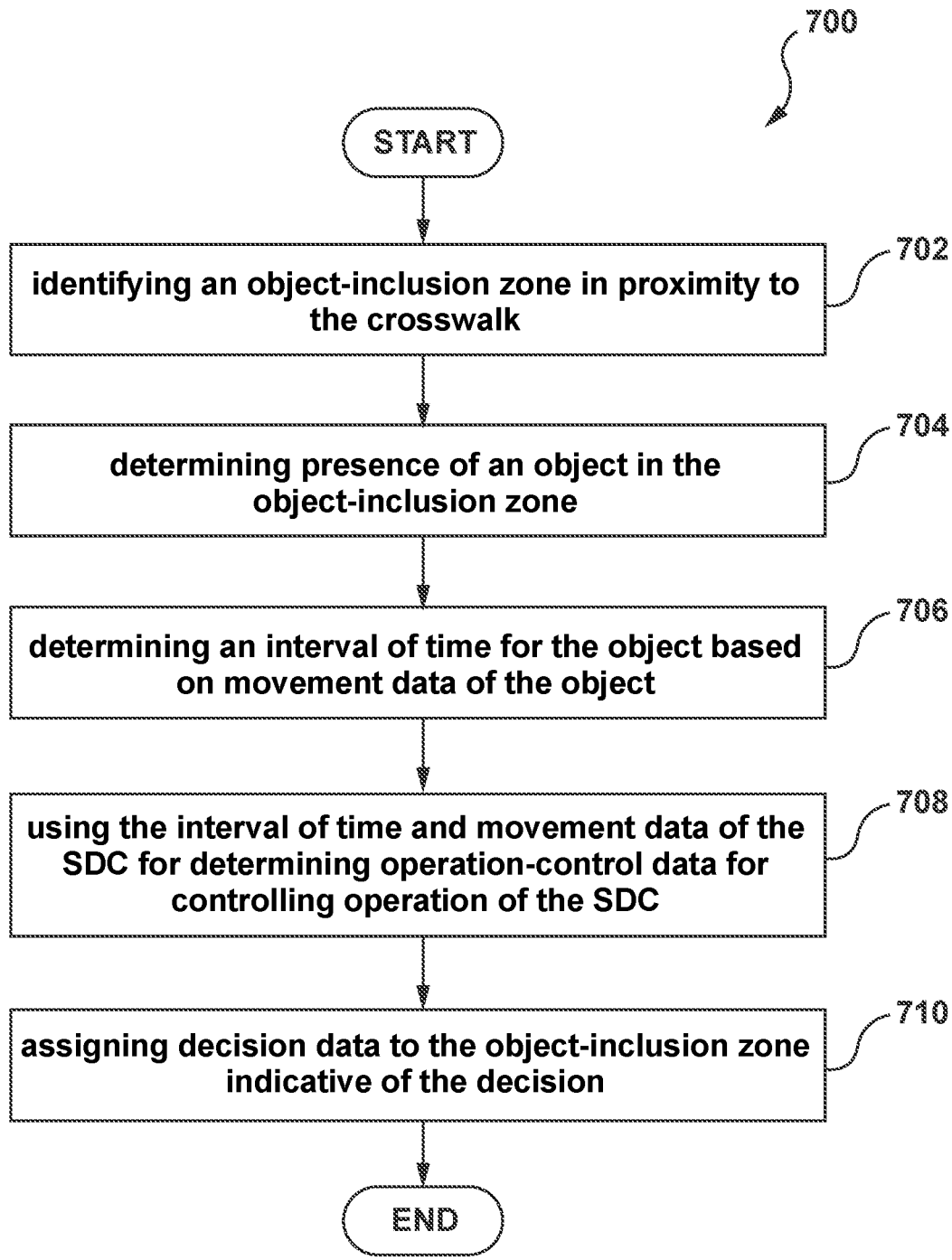
FIG. 7 is a schematic block representation of a method of operating the vehicle, in accordance with at least some embodiments of the present technology.

In some embodiments of the present technology, the electronic device 210 may be configured to execute a method 700, depicted via a block diagram representation in FIG. 7, of controlling operation of a SDC. For example, the SDC may be implemented as the vehicle 220 communicatively coupled to the electronic device 210. It should be noted that some steps of the method 700 may be executed by the electronic device 210 at a first moment in time during an approach of the SDC to a given crosswalk, while other steps of the method 700 may be executed by the electronic device 210 at a second moment in time while the SDC is stopped at the given crosswalk. In some cases, the second moment in time may be after the first moment in time. Various steps of the method 700 will now be discussed in greater detail herein below.

Step 702: Identifying an Object-Inclusion Zone in Proximity to the Crosswalk

The method 700 begins at step 702 with the electronic device 210 configured to, at a first moment in time during an approach of the vehicle 220 to the crosswalk 400 (see FIG. 4), identify the object-inclusion zone 450 in proximity to the crosswalk 400. For example, the electronic device 210 may be configured to identify the object-inclusion zone 450 at the moment T1.

It is contemplated that the electronic device 210 may be configured to identify the object-inclusion zone 450 in any suitable manner for a given application. As previously alluded to, the size of the object-inclusion zone 450 may be pre-determined. As an example, the object-inclusion zone 450 may be identified as a rectangular box sized 2 m×5 m area of a side walk being located at one end of the crosswalk 400. Nevertheless, object-inclusion zones having smaller areas or larger areas than the previously mentioned area are also contemplated in at least some embodiments of the present technology.

In other non-limiting embodiments of the present technology, the size of the object-inclusion zone 450 may be proportionate to the size of the crosswalk 400. As an example, the larger the size of the crosswalk 400, the larger the size of the object-inclusion zone 450. In yet further non-limiting embodiments of the present technology, the shape of the object-inclusion zone 450 can be other than a rectangular box, such as a polygon-shaped zone, irregular shape zone, or the like.

Optionally, the electronic device 210 may be configured to identify more than one object-inclusion zone in proximity to the crosswalk 400, such as one in proximity to each end of the crosswalk 400.

Step 704: Determining Presence of an Object in the Object-Inclusion Zone

The method 700 continues to step 704 with the electronic device 210 configured to, at the first moment in time during an approach of the vehicle 220 to the crosswalk 400 (e.g., at the moment T1), determine presence of the object 402 in the object-inclusion zone 450.

For example, the electronic device 210 may be configured to acquire sensor data from the sensor system 230 of the vehicle 220 which is indicative of the presence of the object 402 in the object-inclusion zone 450. As a result, the electronic device 210 may be configured to assign a unique ID to the object 402 at the moment T1 for identifying the object 402 at the moment T1. As illustrated in FIG. 4, the electronic device 210 may be configured to assign a unique ID "ID1" to the object 402 at the moment T1.

It is also contemplated that the electronic device 210 may be configured to acquire the movement data of the object 402. In one implementation, the electronic device 210 may receive sensor data from the sensor system 230 of the vehicle, for example, which is indicative of movement data of the object 402. For example, movement data of the object 402 may be indicative of current position, current velocity, and/or current acceleration of the object 402 and/or predicated future position, predicted future velocity, and/or predicted future acceleration of object 402. Put another way, the movement data of the object 402 may be indicative of a current movement of the object 402 and/or predicted future movement of the object 402.

Step 706: Determining an Interval of Time for the Object Based on Movement Data on the Object The method 700 continues to step 706 with the electronic device 210 configured to, at the first moment in time during an approach of the vehicle 220 to the crosswalk 400 (e.g., at the moment T1), determine the interval of time 504 (see FIG. 5) for the object 402 based on the movement data of the object 402.

Broadly speaking, the interval of time 504 for object 402 is indicative of a temporal window during which the object 402 is estimated/predicted to be crossing the crosswalk 400. For example, the electronic device 210 may be configured employ the movement data of the object 402 in order to determine (i) the moment in time t30 when the object 402 is estimated to engage the crosswalk 400 and thereby start crossing the crosswalk 400, and (ii) the moment in time t40 when the object 402 is estimated to disengage the crosswalk 400 and thereby finish crossing the crosswalk 400 at the other side thereof.

In some embodiments, the electronic device 210 may further be configured to determine the buffered interval of time 510 based on the interval of time 504 and the time buffer 506 so as to enlarge the temporal window during which the object 402 is estimated to be crossing the crosswalk 400. This buffered interval of time 510 may be used during a further step of the method 700 (e.g., step 708) instead of the interval of time 504 for determining operation-control data for the vehicle 220. This may be performed for at least one of safety and/or courteous purposes, as discussed above.

Step 708: Using the Interval of Time and Movement Data of the SDS for Determining Operation-Control Data for Controlling Operation of the SDC The method 700 continues to the step 708 with the electronic device 210 configured to, at the first moment in time during an approach of the vehicle 220 to the crosswalk 400 (e.g., at the moment T1), use the interval of time 504 (and/or optionally the buffered interval of time 510) and the movement data of the vehicle 220 for determining the operation-control data for controlling operation of the vehicle 220.

As mentioned above, the operation-control data is indicative of a decision on a priority of way through the crosswalk 400 between the vehicle 220 and the object 402.

In some embodiments, during the step 708, the electronic device 210 may be configured to determine the other interval of time 502 for the vehicle 220 based on the movement data of the vehicle 220. Broadly speaking, the interval of time 502 for vehicle 220 is indicative of a temporal window during which the vehicle 220 is estimated/predicted to be driving through the crosswalk 400. For example, the electronic device 210 may be configured employ the movement data of the vehicle 220 in order to determine (i) the moment in time t10 when the vehicle 220 is estimated to engage the crosswalk 400 and thereby start driving through the crosswalk 400, and (ii) the moment in time t20 when the vehicle 220 is estimated to disengage the crosswalk 400 and thereby finish driving through the crosswalk 400.

It can be said that in at least some embodiments of the present technology, the electronic device 210 may be configured to determine the operation-control data based on weather or not the interval of time 502 of the object 402

(and/or optionally the buffered interval of time 504) at least partially overlaps the other interval of time of the vehicle 220.

For example, if the interval of time 502 of the object 402 (and/or optionally the buffered interval of time 504) at least partially overlaps the other interval of time of the vehicle 220, then the operator-control data may be indicative of a decision that the object 402 has the priority of way through the crosswalk 400.

In another example, if the interval of time 502 of the object 402 (and/or optionally the buffered interval of time 504) does not overlap the other interval of time of the vehicle 220, then the operator-control data may be indicative of a decision that the vehicle 220 has the priority of way through the crosswalk 400.

In at least some embodiments of the present technology, the electronic device 210 may further be configured to trigger the vehicle 220 to operate in accordance with the operation-control data.

In the example where the operator-control data is indicative of a decision that the object 402 has the priority of way through the crosswalk 400, the electronic device 210 may be configured to trigger the vehicle 220 to stop at the crosswalk 400 and allow any object from the object-inclusion zone 450 to cross the crosswalk 400.

In the example where the operator-control data is indicative of a decision that the vehicle 220 has the priority of way through the crosswalk 400, the electronic device 210 may be configured to trigger the vehicle 220 to pass through the crosswalk 400 before any object from the object-inclusion zone 450 crosses the crosswalk 400.

Step 710: Assigning Decision Data to the Object-Inclusion Zone Indicative of the Decision The method 700 continues to step 710 with the electronic device 210 configured to, at the first moment in time during an approach of the vehicle 220 to the crosswalk 400 (e.g., at the moment T1), assign the decision data 455 to the object-inclusion zone 450 which is indicative of the decision regarding the priority of way through the crosswalk 400 between the vehicle 220 and the object 402.

It should be noted that the electronic device 210 may be configured to assign the decision data 455 to the object-inclusion zone 450 by storing information that associates with the object-inclusion zone 450 with the decision data 455 in a suitable storage. It should also be noted that this assignment of the decision data 455 to the object-inclusion zone 450 (as opposed to assignment of the decision data 455 to the object 402 identifiable via the first unique ID "ID1", for example) is performed such that the priority of way between (i) the vehicle 220 and (ii) any other object identifiable by an other unique ID that is different from the first unique ID "ID1" in the object-inclusion zone 450, is the same as between the vehicle 220 and the object 402 identifiable via the first unique ID "ID1".

For example, as seen in FIG. 4, at the moment T2 which is after the moment T1 during the approach of the vehicle 220 to the crosswalk 400, the object 402 is no longer identifiable via the first unique ID "ID1", but rather by a second unique ID "ID2". Nevertheless, since the decision data 455 is assigned to the object-inclusion zone 450 (instead of being assigned to the object 402 indefinable via "ID1") the electronic device 210 may determine that the decision on the priority of way between the object 402 indefinable via "ID2" and the vehicle 220 is already computed and hence can be used without redundant computation.

In at least some embodiments of the present technology, at least some additional steps may be performed by the electronic device when the vehicle 220 is stopped at the crosswalk 400. Let it be assumed that, at the first moment in time during the approach of the SDC to the crosswalk 400 (e.g., the moment T1), the electronic device 210 triggers (based on the operation-control data) the vehicle 220 to stop at the crosswalk 400 and allows any object from the object-inclusion zone 450 to cross the crosswalk 400. In such a case, at the second moment in time while the vehicle 220 is stopped at the crosswalk 400 (e.g., the moment T3 on FIG. 6), the electronic device 210 may be configured to, in response to any object from the object-inclusion zone 450 exiting the object-inclusion zone 450 and beginning crossing the crosswalk 400, assign the new decision data 655 to the object-inclusion zone 450 indicative of a new decision. In at least some embodiments of the present technology, the electronic device 210 may be configured to determine the new decision data 655 in accordance with the presence of the second object 602 identifiable via "ID4" similarly to how the electronic device 210 determined the decision data 455 in accordance with the presence of the object 402 identifiable via "ID1".

However, it should be noted that in cases where the electronic device 210 is configured to use the buffered interval of time 510 for further determining the decision data 455, the electronic device 210 may also use an other buffered interval of time at the second moment in time (e.g., the moment T3). However, the electronic device 210 may be configured use a smaller time buffer for determining the other buffered interval of time than the time buffer 506 used to determine the buffered interval of time 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for controlling operation of a Self-Driving Car (SDC), the method executable by an electronic device coupled to the SDC, the method comprising:
   at a first moment in time during an approach of the SDC to a crosswalk:
      identifying, by the electronic device, an object-inclusion zone in proximity to the crosswalk, the object-inclusion zone potentially including objects that are to cross the crosswalk, information about the object-inclusion zone being stored in and retrievable from a storage;
      determining, by the electronic device, first presence of an object in the object-inclusion zone at the first moment;
      assigning, by the electronic device, the object with a first unique ID, such that the object is identifiable by the first unique ID at the first moment;
      determining, by the electronic device, an interval of time for the object based on movement data of the object, the interval of time being indicative of a temporal window during which the object is estimated to be crossing the crosswalk;
      using, by the electronic device, the interval of time and movement data of the SDC for determining operation-control data for controlling operation of the SDC, the operation-control data being indicative of a decision on a priority of way through the crosswalk between the SDC and the object identified by the first unique ID at the first moment;

assigning, by the electronic device, decision data to the object-inclusion zone indicative of the decision, thereby updating information stored in the storage by storing the decision data in association with the information about the object-inclusion zone; and at a second moment in time during an approach of the SDC to the crosswalk, the second moment being a later moment in time respective to the first moment:

determining, by the electronic device, second presence of the object in the object-inclusion zone at the second moment, the object being assigned with a second unique ID different from the first unique ID, such that the object is identifiable by the second unique ID at the second moment; and retrieving, by the electronic device, the decision data assigned to the object-inclusion zone at the first moment for determining the operation-control data for controlling operation of the SDC, such that the priority of way between the SDC and the object identified by the second unique ID at the second moment is the same as the priority of the way between the SDC and the object identified by the first unique ID at the first moment.

2. The method of claim 1, wherein the method further comprises, at the first moment or the second moment in time during the approach of the SDC to the crosswalk: triggering, by the electronic device, the SDC to operate in accordance with the operation-control data.

3. The method of claim 2, wherein the triggering comprises one of:

triggering, by the electronic device, the SDC to stop at the crosswalk and allowing any object from the object-inclusion zone to cross the crosswalk; and triggering, by the electronic device, the SDC to pass through the crosswalk before any object from the object-inclusion zone crosses the crosswalk.

4. The method of claim 1, wherein the method further comprises:

at the first moment or the second moment in time during the approach of the SDC to the crosswalk, triggering, by the electronic device based on the operation-control data, the SDC to stop at the crosswalk and allowing any object from the object-inclusion zone to cross the crosswalk; and at a third moment in time while the SDC is stopped at the crosswalk: in response to any object from the object-inclusion zone exiting the object-inclusion zone and beginning crossing the crosswalk, assigning, by the electronic device, new decision data to the object-inclusion zone indicative of a new decision.

5. The method of claim 4, wherein in response to the any object from the object-inclusion zone exiting the object-inclusion zone and beginning crossing the crosswalk, the method further comprises:

determining, by the electronic device, presence of a second object in the object-inclusion zone, the second object being identifiable by a second unique ID;

determining, by the electronic device, a second interval of time for the second object based on movement data of the second object, the second interval of time being indicative of a second temporal window during which the second object is estimated to be crossing the crosswalk;

using, by the electronic device, the second interval of time and movement data of the SDC for determining new operation-control data for controlling operation of the SDC, the new operation-control data being indicative of a new decision on a priority of way through the crosswalk between the SDC and the second object;

and wherein the assigning the new decision data to the object-inclusion zone indicative of the new decision is performed by the electronic device, such that the priority of way between the SDC and any other object identifiable by another unique ID that is different from the second unique ID in the object-inclusion zone is same as between the SDC and the second object.

6. The method of claim 5, wherein the method further comprises:

determining, by the electronic device, a buffered interval of time based on the interval of time and a first time buffer, so as to enlarge the temporal window during which the object is estimated to be crossing the crosswalk;

using, by the electronic device, the buffered interval of time instead of the interval of time for determining the operation-control data;

determining, by the electronic device, a second buffered interval of time based on the second interval of time and a second time buffer, so as to enlarge the second temporal window during which the second object is estimated to be crossing the crosswalk, the second time buffer being smaller than the first time buffer; and using, by the electronic device, the second buffered interval of time instead of the second interval of time for determining the new operation-control data.

7. The method of claim 1, wherein the method further comprises:

determining, by the electronic device, a buffered interval of time based on the interval of time and a first time buffer, so as to enlarge the temporal window during which the object is estimated to be crossing the crosswalk; and using, by the electronic device, the buffered interval of time instead of the interval of time for determining the operation-control data.

8. An electronic device for controlling operation of a Self-Driving Car (SDC), the electronic device coupled to the SDC, the electronic device being configured to:

at a first moment in time during an approach of the SDC to a crosswalk:

identify an object-inclusion zone in proximity to the crosswalk, the object-inclusion zone potentially including objects that are to cross the crosswalk, information about the object-inclusion zone being stored in and retrievable from a storage of the electronic device;

determine first presence of an object in the object-inclusion zone at the first moment;

assign the object with a first unique ID, such that the object is identifiable by the first unique ID at the first moment;

determine an interval of time for the object based on movement data of the object, the interval of time being indicative of a temporal window during which the object is estimated to be crossing the crosswalk;

use the interval of time and movement data of the SDC for determining operation-control data for controlling operation of the SDC,
  the operation-control data being indicative of a decision on a priority of way through the crosswalk between the SDC and the object identified by the first unique ID at the first moment;
assign decision data to the object-inclusion zone indicative of the decision by storing the decision data in association with the information about the object-inclusion zone, thereby updating information stored in the storage;
at a second moment in time during an approach of the SDC to the crosswalk, the second moment being a later moment in time respective to the first moment:
determine second presence of the object in the object-inclusion zone at the second moment, the object being assigned with a second unique ID different from the first unique ID, such that the object is identifiable by the second unique ID at the second moment; and
retrieve by the electronic device from the storage, the decision data assigned to the object-inclusion zone at the first moment for determining the operation-control data for controlling operation of the SDC, such that the priority of way between the SDC and the object identified by the second unique ID at the second moment is same as the priority of way between the SDC and the object identified by the first unique ID at the first moment.

9. The electronic device of claim 8, wherein the electronic device is further configured to, at the first moment or the second moment in time during the approach of the SDC to the crosswalk: trigger the SDC to operate in accordance with the operation-control data.

10. The electronic device of claim 9, wherein to trigger the electronic device is configured to one of:
trigger the SDC to stop at the crosswalk and allowing any object from the object-inclusion zone to cross the crosswalk; and
trigger the SDC to pass through the crosswalk before any object from the object-inclusion zone crosses the crosswalk.

11. The electronic device of claim 8, wherein the electronic device is further configured to:
at the first moment or the second moment in time during the approach of the SDC to the crosswalk, trigger based on the operation-control data, the SDC to stop at the crosswalk and allowing any object from the object-inclusion zone to cross the crosswalk;
at a third moment in time while the SDC is stopped at the crosswalk: in response to any object from the object-inclusion zone exiting the object-inclusion zone and beginning crossing the crosswalk,
assign new decision data to the object-inclusion zone indicative of a new decision.

12. The electronic device of claim 11, wherein in response to the any object from the object-inclusion zone exiting the object-inclusion zone and beginning crossing the crosswalk, the electronic device is further configured to:
determine presence of a second object in the object-inclusion zone,
  the second object being identifiable by a second unique ID;
determine a second interval of time for the second object based on movement data of the second object,
  the second interval of time being indicative of a second temporal window during which the second object is estimated to be crossing the crosswalk;
use the second interval of time and movement data of the SDC for determining new operation-control data for controlling operation of the SDC,
  the new operation-control data being indicative of a new decision on a priority of way through the crosswalk between the SDC and the second object;
and wherein the electronic device is configured to assign the new decision data to the object-inclusion zone indicative of the new decision such that the priority of way between the SDC and any other object identifiable by an other unique ID that is different from the second unique ID in the object-inclusion zone is same as between the SDC and the second object.

13. The electronic device of claim 12, wherein the electronic device is further configured to:
determine a buffered interval of time based on the interval of time and a first time buffer,
  so as to enlarge the temporal window during which the object is estimated to be crossing the crosswalk;
use the buffered interval of time instead of the interval of time for determining the operation-control data;
determine a second buffered interval of time based on the second interval of time and a second time buffer,
  so as to enlarge the second temporal window during which the second object is estimated to be crossing the crosswalk,
    the second time buffer being smaller than the first time buffer; and
use the second buffered interval of time instead of the second interval of time for determining the new operation-control data.

14. The electronic device of claim 8, wherein the electronic device is further configured to:
determine a buffered interval of time based on the interval of time and a first time buffer,
  so as to enlarge the temporal window during which the object is estimated to be crossing the crosswalk; and
use the buffered interval of time instead of the interval of time for determining the operation-control data.

* * * * *